Dec. 28, 1943.　　G. P. HOFMANN　　2,337,819

DRILL POINT GAUGE

Filed Jan. 25, 1943

INVENTOR
Gustav P. Hofmann
BY
G. Ward Kemp
ATTORNEY

Patented Dec. 28, 1943

2,337,819

UNITED STATES PATENT OFFICE 2,337,819

DRILL POINT GAUGE

Gustav Philip Hofmann, Seattle, Wash.

Application January 25, 1943, Serial No. 473,567

2 Claims. (Cl. 33—201)

This invention relates to tools for use in grinding cutting lips of twist drills, and particularly for determining the angles of the cutting lips of the twist drills and for equalizing the length of the two lips.

In the use of twist drills for boring holes in metals and other materials it is important that the two oppositely disposed lips or cutting edges shall be of the same length and have a proper and uniform angle with the longitudinal axis of the drill. When a lip on one side is longer than the other, the hole formed by the drill will be larger than the drill, and when the bevels on the lips are not equal, the drill will not cut properly. The angle for most purposes has been accepted as best when sloping back from the point of the drill at an angle of 59 degrees. Heretofore much difficulty has been found in grinding such drills to provide the cutting lips of equal lengths and equal angles. Some devices have been used for measuring one lip at a time against a graduated scale, but results have been unsatisfactory and it is most difficult to obtain equality either in angles or in the length of the lips when measured separately against a degree line on a scale. It is necessary also that the axis of the drill be maintained in correct alignment with the measuring device for unless the drill is properly sustained in relation to the scale, the difference in length and angle of the lips may be considerable, and even experienced mechanics have difficulty in reaching desired results when grinding with any device heretofore known.

It is, therefore, an object of this invention to provide a tool which may be used by a person with little experience, and whereby he may be enabled to grind the cutting lips and points of drills in proper shape for perfect work in drilling.

A further object is to provide such a tool with a pair of blades slidably connected together with the lower faces thereof formed with the desired angle or degree which a drill should have on its cutting edges when shaped by grinding; said blades being adjustable for drills of various sizes and having jaws projected beneath the outer ends of such blades, with pins extended inward toward each other from such jaws for supporting the lips of a drill against the respective blades; together with a guide for maintaining the axis of the drill in the same plane with the blades. A still further object is to provide a tool whereby equal lengths of lips and equal edges or degrees of slope of such lips may be determined by one inspection, and may be so inspected and checked and equalized, without the necessity of using a graduated scale or measuring.

Figure 1:
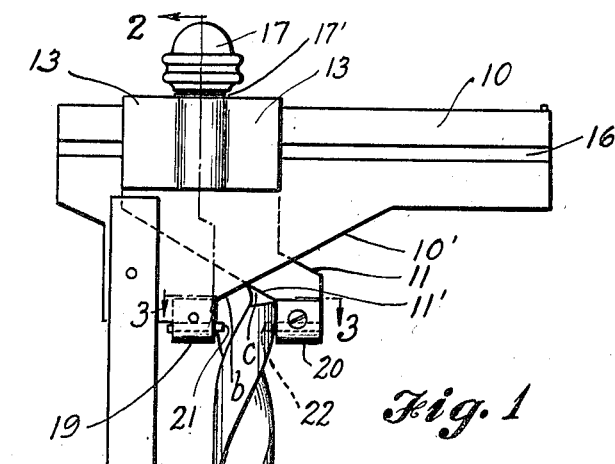
Figure 2:
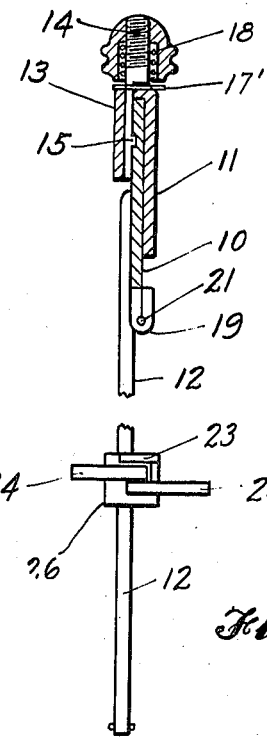
Figure 4:
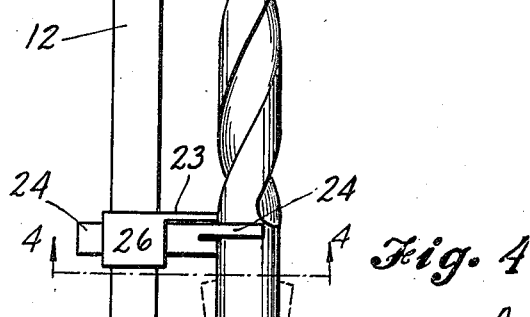
Figure 3:
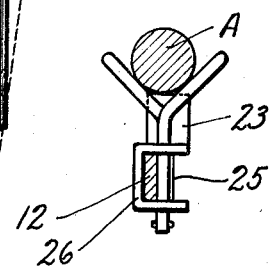
Figure 3:
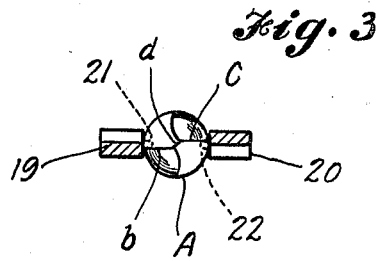

With these and other objects to be hereinafter stated, I have illustratively exemplified my invention by the accompanying drawing of which: Figure 1 is a side view of the tool with the drill in position; Figure 2 is a section view taken on line 2—2 of Figure 1. Figure 3 is a view taken on line 3—3 of Fig. 1, looking down on a drill point, with supporting jaws in section. Figure 4 is a view taken on line 4—4 of Fig. 1, showing the handle in section, with a supporting post and yoke for the drill, in section.

In describing the tool the references to directions apply to Fig. 1 for convenience. Like characters on the different figures refer to like parts. Numeral 10 represents one of the blades with the lower edge 10' thereof sloping or beveled in a degree desired for the cutting lips of a twist drill, A. 11 represents another similar blade with the lower edge 11' sloped with the same bevel or degree, but in the opposite direction so that when placed together with the other blade the bevels will provide a guide for checking both lips of $b$ and $c$ of the drill, against the blades at the same time; the tops of the two angles on the blades forming the apex of a cone for the point $d$ of the drill.

Affixed to the left hand of the blade 10, is a bar 12 which serves both as a handle for operating the tool and to support the top of the drill when the lips are to be tested. The blade 11 is slidably mounted against the blade 10, preferably by turning down the extended upper edge of 11 over the upper edge of 10, for a clamp 13. A binding screw 14 is positioned through the fold of the clamp with a latch point 15 slidably disposed in a groove 16 along the front of the blade 10. By tightening the nut 17 over washer 17' on the screw the two blades may be tightly bound together suitably for drills of varying diameters. A tension spring 18 in the nut facilitates a smooth movement of the blades while being adjusted for drills.

The two blades are positioned one behind the other so that when adjusted at the opposite sides of a drill, sufficient offset between the two will provide a suitable width for the cutting point $d$ of the drill. Each blade is provided with jaws as 19 and 20 to serve as abutments for sustaining a drill in alignment against the blades. Pins 21 and 22 are extended from the jaws inward toward each other on the same plane, against which the shoulders of opposite grooves on the drill are oppositely supported, whereby the cutting lips of the drill are sustained in alignment against the beveled edges of the blades. In order to proide a support for the drill to hold the axis thereof in alignment with the blades, a bar 23 is attached to one of the blades which also serves as a handle for the tool. Some drills are provided with shanks of greater diameter than their bodies as shown in dotted lines marked E, in Fig. 1, and in order to maintain such drills in proper alignment, a post 24 is slidably mounted on the handle and may be moved to any desired position along the body of the drill. The face of the jaw 19 is positioned at a distance from the handle equal to the distance of the top of the post from the handle, so that the drill body resting on the post and on the jaw, will be in alignment with the apex of the cone and blades, and the angles on the two edges of the blades will provide for equal angles on the opposite cutting edges of the drill. In order to sustain the drill in lateral alignment with the handle, a yoke 24 is slidably mounted on the post and may be raised or lowered to fit the bodies of drills of varying diameters. This yoke is offset on one side of the handle equal to the offset of the blade 10 on one side of the handle. A tension spring 25 is positioned between the handle and retaining bands 26 of the post, whereby the post and yoke are each sustained at any desired point along the handle.

In use the blade 11 may be moved to fit drills of varying diameters, and the drill positioned upon the post and jaw 19 with one cutting edge on blade 10. The blade 11 is then moved inward until the jaw 20 meets the drill and the blade 11 is then locked by the screw 14. The pins 21 and 22 rest against the threads of opposite grooves of the drill and appear one in front and the other behind from a front view, and so sustain the cutting edges of the drill on the blades. The operator can then readily detect and correct any difference in bevel or length of the two cutting edges of the drill simultaneously; and the point $d$ will also be given a proper angle between the lips. As twist drills are some times broken in two parts, this tool greatly facilitates the reformation of new cutting lips and points on the upper section. The tool also facilitates rapid adjustments for ordinary sharpening and grinding of tools in practice.

Having described my invention, I claim as new:

1. A tool for use in gauging cutting points and lips on twist drills, comprising, two blades slidably connected and mounted substantially opposite to each other and having their adjacent edges beveled for determining the bevels and angles and lengths of two cutting lips of the drill simultaneously, jaws projected from the outer ends of the blades, for supporting opposite sides of the drills, pins projected inward from the jaws for oppositely supporting opposite ribs of the drills for aligning the cutting edges of the drills with the beveled edges of the blades, a bar extended from one of the blades parallel with the jaws for a handle and for supporting the drills, an adjustable post slidably mounted on the bar and adapted to aid in maintaining the axis of the drills in alignment with the jaws and blades, to facilitate the forming of both of the cutting edges, with equal bevels and lengths.

2. A tool for measuring both cutting lips of a twist drill simultaneously, including a pair of blades mounted opposite to each other and having their opposing faces sloping downward and outward to provide two faces converging with an apex at the top with angles desired for forming lips on the drill, said blades being in slidable relation to conform to drills of varying diameters, a pair of pins oppositely positioned and supported in spaced relation beneath the blades for projecting into opposite grooves of drills for steadying the bodies thereof and for sustaining opposite cutting lips of a drill in alignment with the blades, a handle carried by one of the blades provided with an adjustable post slidably mounted thereon for sustaining the axis of the drill in alignment with said blades and apex, to facilitate the rapid and accurate equalization of the lengths and bevels on both cutting lips of the drill, with means for locking the blades together at varying points for measuring drills of varying diameters.

GUSTAV PHILIP HOFMANN.